US006457364B1

(12) United States Patent
Howell

(10) Patent No.: US 6,457,364 B1
(45) Date of Patent: Oct. 1, 2002

(54) ULTRASOUND SURVEILLANCE AND BREAK-IN ALARM

(75) Inventor: Brian Rodney Howell, Blackburn (AU)

(73) Assignee: Robert Bosch (Australia) Pty, Limited (AU)

( * ) Notice: Subject to any disclaimer, the term of this patent is extended or adjusted under 35 U.S.C. 154(b) by 0 days.

(21) Appl. No.: 09/674,983

(22) PCT Filed: Apr. 23, 1999

(86) PCT No.: PCT/DE99/01220

§ 371 (c)(1), (2), (4) Date: Jan. 8, 2001

(87) PCT Pub. No.: WO99/58998

PCT Pub. Date: Nov. 18, 1999

(30) Foreign Application Priority Data

May 11, 1998 (AU) .............................................. PP3465
Mar. 23, 1999 (AU) .............................................. 21377/99

(51) Int. Cl.[7] ................................................ G01S 15/04
(52) U.S. Cl. ........................... 73/602; 73/627; 340/426; 340/541; 340/552; 340/367; 340/93
(58) Field of Search .......................... 73/602, 620, 627, 73/628, 629, 631; 340/426, 541, 545.1, 552, 550; 367/93, 112

(56) References Cited

U.S. PATENT DOCUMENTS 4,123,748 A * 10/1978 Otani .................... 340/310.03
4,229,811 A * 10/1980 Salem ........................ 367/112
4,242,743 A * 12/1980 Salem ......................... 367/93
4,290,126 A * 9/1981 McFadyen et al. ........... 367/93
4,499,564 A * 2/1985 Sirai .......................... 340/552
4,639,902 A * 1/1987 Leverance et al. .......... 340/552
4,807,255 A * 2/1989 Idland ........................ 340/538
4,929,925 A * 5/1990 Bodine et al. .............. 180/167
5,012,455 A 4/1991 Schwarz et al. .............. 367/93
5,680,096 A * 10/1997 Grasmann ................... 340/426

FOREIGN PATENT DOCUMENTS

DE 37 01 521 8/1988
DE 192 21 511 2/1997
JP 357067869 A * 4/1982 ................. 340/552

* cited by examiner

*Primary Examiner*—Hezron Williams
*Assistant Examiner*—Rose M. Miller
(74) *Attorney, Agent, or Firm*—Kenyon & Kenyon

(57) ABSTRACT

An ultrasonic monitoring method and system is disclosed. The method includes transmitting a sequence of ultrasonic pulses into a space; receiving a resultant echo signal; monitoring the space for intrusion by comparing the resultant echo signal received in a first window period with the resultant echo signal received in a second window period, wherein the pulses within the sequence are separated by a time interval such that echoes generated from the pulses are superimposed to form the resultant signal.

9 Claims, 1 Drawing Sheet

ULTRASOUND SURVEILLANCE AND BREAK-IN ALARM

FIELD OF THE INVENTION

This present invention relates to ultrasonic monitoring and intruder detection, particularly but not exclusively, for a vehicle interior.

BACKGROUND INFORMATION

A number of ultrasonic monitoring processes are known, as disclosed in, for example, German Patent No. DE 195 21 511, which relates to monitoring an interior compartment of a vehicle. The processes involve transmission of an ultrasonic pulse, receiving a resultant echo signal and comparing the echo signal envelope with a presettable reference profile or a preceding echo signal envelope. Intrusion may be assumed if the comparison returns a difference exceeding a threshold level. The interval between pulses is greater than the duration of the received echo signal such that each echo signal envelope is sequentially received without any overlap, to provide a representation of the entire vehicle interior.

SUMMARY OF THE INVENTION

In accordance with the present invention, there is provided an ultrasonic monitoring method in which a sequence of ultrasonic pulses is transmitted into a space, and a resultant echo signal is received. The space is monitored for intrusion by comparing the resultant echo signal received in a first window period with the resultant echo signal received is a second window period. The pulses are separated by a time interval such that echoes generated from the pulses superimposed to form the resultant signal.

Preferably, the echo signal received in the first window period is stored for real time comparison with the echo signal received in the second window period.

Preferably, the window periods are synchronised with the pulses.

Preferably, the method includes transmitting the sequence of pulses in a first operational period. The transmission of the pulses is terminated until a second operational period is commenced if the comparison returns a result below a threshold level, and the transmission of the pulses is continued as an intrusion sequence if the comparison returns a result above a threshold level.

In another aspect of the present invention, there is provided an ultrasonic monitoring system for use in the above described method. The system includes a transmitter, a receiver, and a microprocessor arranged to transmit a sequence of ultrasonic pulses from the transmitter at a predetermined interval and a receive and compare a resultant echo signal over a plurality of window periods. The interval is such that echoes generated from the pulses are superimposed to form the resultant signal.

Preferably, the microprocessor is adapted to terminate the sequence of pulses for the remainder of a first operational period and adapted to retransmit the sequence in a second operational period if the comparison returns a result below a threshold level. An intrusion sequence is actuated if the comparison returns a result above the threshold level.

DETAILED DESCRIPTION

Figure 1:
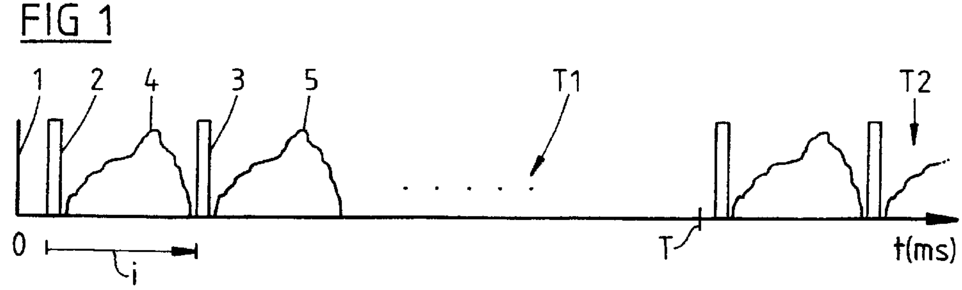
FIG. 1 is a diagrammatic time sequence illustrating a prior art ultrasonic monitoring process.

The time sequence 1 shown in FIG. 1 illustrates a prior art ultrasonic monitoring process. The process involves transmission of a plurality of ultrasonic pulses 2, 3 in an interior compartment of a vehicle. Each pulse generates a spacial echo signal represented by a respective signal envelope 4,5. The interval "I" between each pulse is determined such that the signal envelope finishes prior to a further pulse being transmitted. A comparison of the signal envelopes provides a determination as to whether an intruder has entered the vehicle. If the difference between the signal envelopes is minimal i.e. below a threshold level, it is assumed that no intrusion has occurred and the pulses are terminated for the remainder of the operational period T1 which ends at time "T", which may be, for example, 500 ins after the start of the pulse sequence. The same sequence is adopted at the commencement of a second operational period T2.

Figure 2:
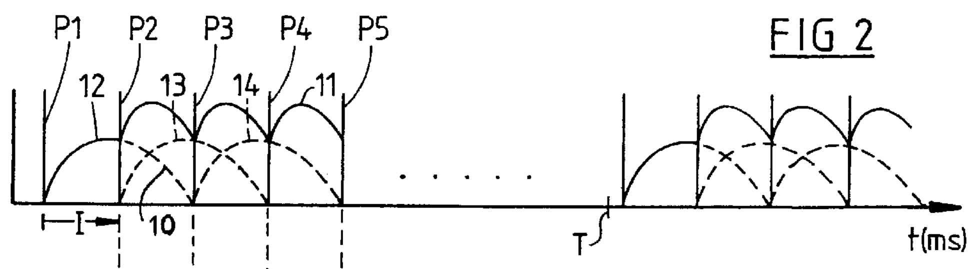
FIG. 2 is a diagrammatic time sequence illustrating ultrasonic monitoring in accordance with the present invention.

The present invention, on the other hand, utilises a superposition of echo signal envelopes, as shown in FIG. 2. A plurality of pulses P1 to P4 are transmitted into a space, such as a vehicle compartment, at a predetermined interval "I" which is less than the duration of a returned echo signal envelope 10 so that a resultant echo signal 11 is generated as a result of the superposition of the plurality of individual signal envelopes (shown in dashed lines). More particularly, the first pulse P1 results in a first echo signal envelope 10. The second pulse P2 produces a corresponding second signal envelope 13 and the third pulse P3 likewise produces a third signal envelope 14. The envelopes are superimposed and the resultant signal 11 is received and recorded in window periods W1 and W2, between the second and third pulses (P2, P3), and third and fourth pulses (P3, P4), respectively. A comparison is then made between the signal recorded in W2 from that recorded in W1, or vice versa. This comparison is made during period C1, immediately following the fourth pulse P4. A more preferable method of comparison is to record the signal received in W1 for a real-time comparison with the signal received in W2. If the comparison returns a result which is less than a predetermined threshold level, then it is assumed that no intrusion has occurred and the pulses may be terminated for the rest of the first operational period and recommenced at the commencement of the second operational period. If, however, the difference exceeds the threshold level, further pulses such as P5 may be transmitted and an intrusion sequence initiated either through activation of an alarm or further pulse transmission for subsequent comparison and verification of the differences.

Figure 3:
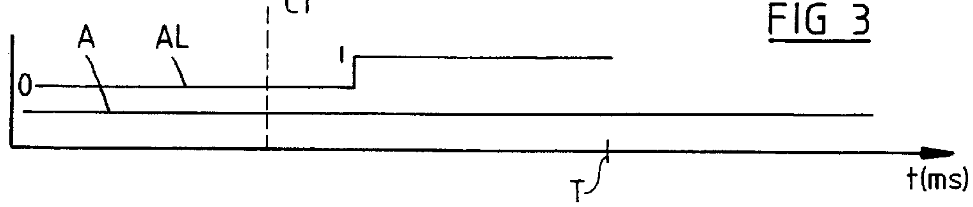
FIG. 3 is a first illustration of the operational states of a microprocessor used with the present invention.
Figure 4:
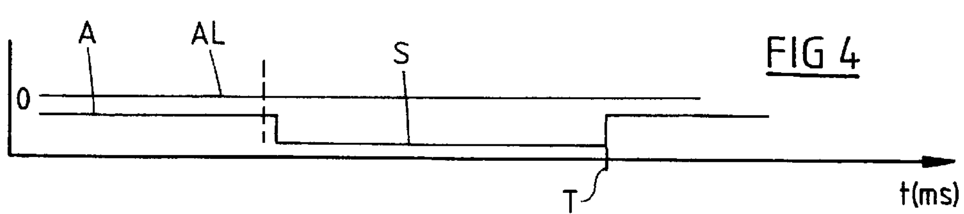
FIG. 4 is a second illustration of the operational states of the microprocessor used with the present invention.

In this regard, the system of the present invention (not shown) includes a transmitter, a receiver, which is preferably combined with the transmitter in a transceiver, and a microprocessor for receiving and sampling the echo signal 11 resulting from the pulses generated by the transmitter. In FIG. 3, the microprocessor is diagrammatically represented in an active state 'A'. It is shown as remaining in an active state since a difference is detected in C1 exceeding the threshold level. Consequently, pulse transmission is maintained for a further comparison utilising of the signal received in a third window between pulse P4 and P5 at C2. If the comparison again shows a difference greater than the threshold level, the microprocessor switches an alarm signal AL from a zero to a logic 1 condition to activate an alarm. FIG. 4 illustrates an alternative mode where the comparison at C1 returns a result which is below a threshold level whereby the microprocessor terminates transmission of the pulses and switches into a sleep mode S for the duration of the first operational period.

Figure 5:
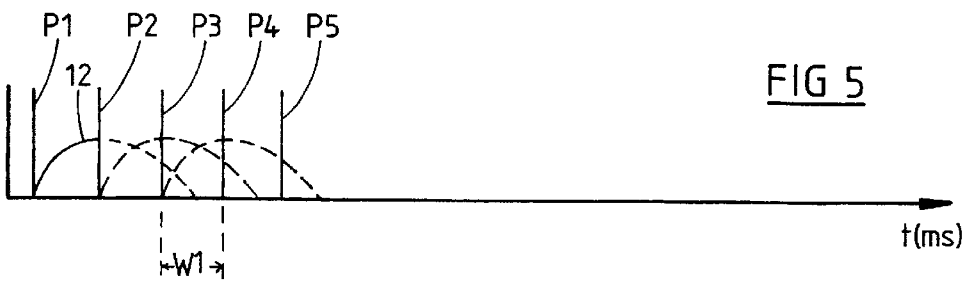
FIG. 5 is a diagrammatic time sequence illustrating a further example of the ultrasonic monitoring of the present invention.

As may be appreciated, at least the first signal envelope 12 must end prior to or within the first sampling window W1 in order for a meaningful comparison to be made between the signal stored in the W1 and W2 windows. As such, if the interval I, is less than half the duration of the single envelope, the first sampling period W1 will need to be delayed until after the third pulse, as represented in FIG. 5. The duration of the signal envelope will depend upon the dimensions of the space which is to be monitored. Accordingly, the number of pulses required before a comparison can be made and the interval between pulses may be appropriately selected depending upon the dimensions in question. However, it is expected that for most vehicles only three to five initial pulses will be required before a comparison can be made. The window periods are also selectable in number and duration for optimum comparison results, whilst being synchronised with the pulses.

The present invention may therefore provide an increase in processing speed and intruder detection, at least in the case where only three initial pulse are required, as compared with the prior art process. Conversely, if no intrusion is detected, the sequence of pulses may be terminated earlier than the prior art process to minimise to time spent with the microprocessor in the entire mode and maximise power saving.

Although the present invention has been described with reference to vehicles, it should be appreciated that the present invention may be equally applicable to any space which needs to be monitored.

Finally, the above method and system have been described by way of example only and many modifications and variations may be made thereto without departing from the spirit and scope of the invention.

What is claimed is:

1. An ultrasonic intrusion monitoring method, comprising the steps of:

transmitting a sequence of ultrasonic pulses into a space;

receiving a resultant echo signal; and monitoring the space for intrusion by comparing the resultant echo signal received in a first window period with the resultant echo signal received in a second window period, wherein the transmitted ultrasonic pulses are separated by a time interval such that echoes generated from the ultrasonic pulses are superimposed to form the resultant echo signal.

2. The ultrasonic intrusion monitoring method according to claim 1, further comprising the step of:

storing the resultant echo signal received in the first window period for a real time comparison with the resultant echo signal received in the second window period.

3. The ultrasonic intrusion monitoring method according to claim 1, further comprising the step of:

synchronizing the first window period and the second window period with the transmitted ultrasonic pulses.

4. The ultrasonic intrusion monitoring method according to claim 1, further comprising the steps of:

transmitting the sequence of ultrasonic pulses in a first operational period, during which the transmission of the ultrasonic pulses is capable of being terminated, until a second operational period is commenced, if the comparison returns a result below a threshold level; and continuing the transmission of the ultrasonic pulses as an intrusion sequence if the comparison returns a result above the threshold level.

5. The ultrasonic intrusion monitoring method according to claim 1, wherein:

the sequence of ultrasonic pulses transmitted is adjustable in relation to the number of pulses transmitted and an interval between the ultrasonic pulses.

6. The ultrasonic intrusion monitoring method according to claim 1, wherein:

the first window period and the second window period are adjustable.

7. An ultrasonic intrusion monitoring system, comprising:

a transmitter for transmitting a sequence of ultrasonic pulses into a space to be monitored;

a receiver for receiving a resultant echo;

a microprocessor for setting a time interval between the ultrasonic pulses of the transmitted sequence, for initializing said transmitter to transmit said sequence of ultrasonic pulses, for receiving a signal from said receiver indicative of the resultant echo received by the receiver, and for comparing said resultant echo signal over a plurality of window periods to determine an intrusion into the monitored space, wherein the predetermined interval is such that echoes generated from the ultrasonic pulses are superimposed to form the resultant echo signal.

8. The ultrasonic intrusion monitoring system according to claim 7, wherein:

the microprocessor terminates the sequence of ultrasonic pulses for a remainder of a first operational period and retransmits the sequence of ultrasonic pulses in a second operational period if the comparison returns a result below a threshold level, and an intrusion sequence is actuated if the comparison returns a result above the threshold level.

9. The ultrasonic intrusion monitoring system according to claim 8, wherein:

the receiver and the transmitter are arranged as a transceiver.

* * * * *